March 19, 1929.  V. A. LANG  1,705,486
JOINT CLOSURE
Filed Nov. 19, 1927
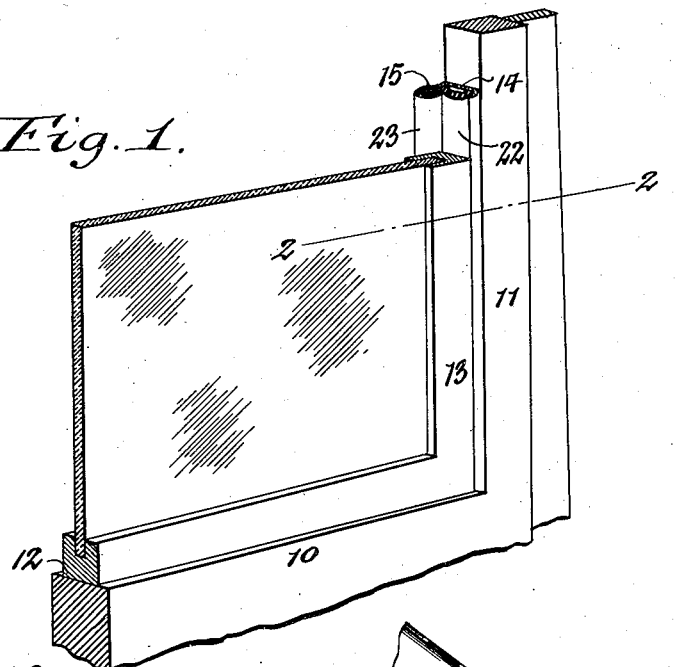
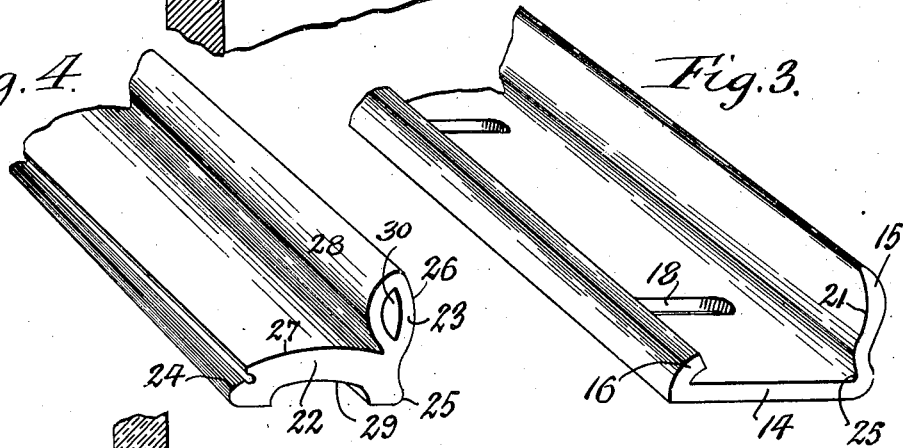
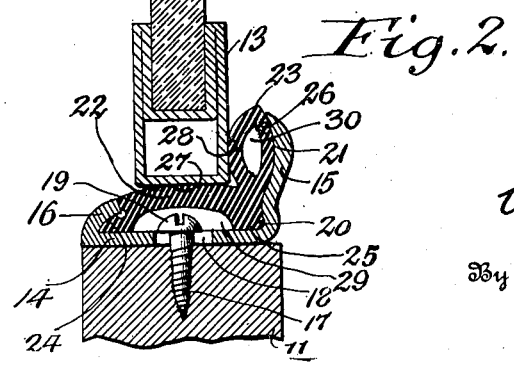
Inventor
Victor A. Lang
By Popp & Powers
Attorneys Patented Mar. 19, 1929.

1,705,486

UNITED STATES PATENT OFFICE.

VICTOR A. LANG, OF BUFFALO, NEW YORK, ASSIGNOR TO BRUNN AND COMPANY INC., OF BUFFALO, NEW YORK, A CORPORATION OF NEW YORK.

JOINT CLOSURE.

Application filed November 19, 1927. Serial No. 234,399.

This invention relates to a joint closure which is more particularly intended for producing a tight and noiseless weather and dust proof joint between the free front edge of an automobile door and the adjacent upright part of this door frame in the automobile body.

It is the object of this invention to provide means which effectively prevent the passage of rain, snow and dust; and also serves as a stop for limiting the closing movement of the door; also cushions the door against side motion and edge motion in order to avoid rattling; and also is capable of ready adjustment for easy assembling and taking up wear.

In the accompanying drawings:

Figure 1 is a perspective view, partly in section showing my improved joint closure applied to the frame and door of an automobile.

Figure 2 is a fragmentary horizontal section, on an enlarged scale, taken on line 2—2, Figure 1.

Figure 3 is a fragmentary perspective view of the holder for the weather or cushion strip.

Figure 4 is a similar view of the weather or cushion strip.

Similar characters of reference indicate like parts in the several figures of the drawings.

This joint closure may be used to advantage in various installations where a weather-tight and noise-proof joint between two relative movable members is required. But the same is primarily designed for use in an automobile for the purpose of producing a tight joint between a door or window and frame.

In the drawings the numeral 10 represents the sill or lower horizontal bar of the frame which surrounds the doorway forming the entrance of the automobile and 11 represents one of the upright side bars of this frame.

The opening or doorway formed within this frame is adapted to be opened and closed by means of a door, the lower horizontal edge 12 of which is adapted to rest on the lower bar or sill 10 of the frame while one of the upright edges 13 thereof is adapted to move horizontally relatively to the upright bar 11 of the door frame.

The improved joint closure forming the subject of this invention is arranged between the outer edge of the upright bar 13 of the door and the inner edge of the opposing upright bar 11 of the door frame and in its preferred form, this joint closure is constructed as follows:

In its general organization this joint closure comprises a holder which is mounted on the door frame and an elastic weather strip which is mounted on the holder and adapted to be engaged by the door. Both the holder and the elastic weather strip are of substantially L-shape in cross section. The holder in its preferred construction is made of metal and comprises a base or bottom plate 14 which is adapted to be secured in an upright position to the vertical edge of the door frame, and an upright wall 15 projecting inwardly from the inner edge of the base 14 so as to overhang the inner side of the adjacent upright edge portion of the door, and a reversely bent flange 16 arranged at the outer edge of the base 14 and overhanging the adjacent part of the base but having a width which is less than the width of the gap between the base 14 and the opposing edge of the door.

This holder may be secured to the door frame by any suitable means but preferably by one or more screws 17, each of which passes through a transverse slot 18 in the base 14 and bears with its head 19 against the outer surface of this base as best shown in Figure 2. At the inner corner of the holder between the base 14 and the wall 15 thereof, this holder is provided with a longitudinally undercut groove 20 and between this groove and the outer extremity of the wall 15, the latter is provided on its inner face with a longitudinal channel or face 21 which is of concave or curved form in cross section. This holder may be made in various ways but is preferably constructed of one piece of extruded brass.

The elastic weather strip is preferably constructed integrally of rubber and comprises a base 22 arranged transversely between the base 14 of the holder and the adjacent vertical edge of the door frame and an upright wall 23 arranged lengthwise between the inner side of the holder wall 15 and the adjacent portion of the side of the door 13 so that this weather strip wall is arranged in a plane parallel with the plane of the door when the latter is in its closed position. This weather strip is preferably secured to the holder by providing the front edge of the base 22 with a longitudinal rabbet 24 which is engaged by the flange 16 so that the front edge of the weather strip base 22 projects underneath this flange, and the outer surface of the base 22 and this flange are flush, as shown in Figure 2. At the outer corner of this weather strip between the base and wall thereof, the same is provided with a longitudinal bead 25 which projects into the undercut groove 20 of the base, as shown in Figure 2, and on the outer side of the weather strip wall 23 the same is provided with a curved convex face or swell 26 which engages the concave seat 21 of the holder wall.

By thus mounting the weather strip on the holder this strip is securely interlocked with the holder and held against displacement thereon while in use, but still permitting this weather strip to be sprung into place while assembling the parts and also sprung out of the holder when this becomes necessary for inspection adjustment and repairing of the parts. Adjustment of the weather strip and its holder on the door frame for causing the inner wall of the weather strip to be tightly engaged by the opposing side of the door may be effected by first loosening the screws 17, and then moving the base transversely on the door frame to a requisite extent, after which these screws are again tightened for holding the parts in their proper position.

The bearing face 27 of the weather strip base is preferably of convex form so as to permit the adjacent edge of the door to readily slide into and out of engagement with this part of the weather strip, and the face 28 of the side wall of the weather strip is also made of convex form so as to enable the same to be compressed more readily and effect a tight joint between the frame of the door when the latter is closed. The resilience of the elastic weather strip is further increased by providing the base and wall thereof with cavities whereby the base and wall of the weather strip are able to yield more readily and adapt themselves to any variation in the relative position of the door frame and door and produce a weather tight joint between these members notwithstanding such variations. The cavity 29 formed for this purpose on the base of the weather strip, preferably is open on the inner or underside of this base so as to form a pocket which receives the heads 19 of the holder fastening screws and permits the base portion of the weather strip to be deflected without interference with these screws. The cavity 30 in the wall of the weather strip is preferably arranged within the central part of this wall so that the latter is practically of tubular form as shown in Figure 2.

In addition to forming a weather tight joint between the door and frame which excludes dust, dirt, wind and rain, the elastic weather strip also provides a cushion or yielding body surface for engagement by the edge and side of the door whereby rattling or chattering noises are prevented due to vibration, when operating the automobile upon which this joint closure is installed.

This joint closure is very simple and compact in construction, the same is not liable to get out of order but can be easily be adjusted and repaired when worn, and the same is neat in appearance rendering it particularly suitable for high class work.

I claim as my invention:

1. A closure for a joint between a door and a frame, comprising a holder of rigid material adapted to be secured to the frame, and a strip of elastic material mounted on said holder and having a base adapted to be engaged by the edge of said door and a wall adapted to be engaged by the side of said door.

2. A closure for a joint between a door and a frame, comprising a holder having a base adapted to be secured to the frame and a wall projecting inwardly from one edge of the base and an elastic strip having a base mounted on the base of the holder and adapted to be engaged by the edge of the door and a wall mounted on the wall of the holder and adapted to be engaged by the side of said door.

3. A closure for a joint between a door and a frame, comprising a holder having a base adapted to be secured to the frame and a wall projecting from one edge of the base, and an elastic strip having a base mounted on the base of the holder and adapted to engage the edge of the door and a wall projecting from one edge of the elastic strip base and engaging the wall of the base and adapted to be engaged by the side of the door.

4. A closure for a joint between a door and a frame, comprising a holder having a base adapted to be secured to the frame, and a wall projecting from one edge of the base, and an elastic strip having a base mounted on the base of the holder and adapted to engage the edge of the door and a wall projecting from one edge of the elastic strip base and engaging the wall of the base and adapted to be engaged by the side of the door, the base of said elastic strip being provided on its rear side with a cavity and the wall of said strip having the form of a longitudinal tube.

5. A closure for a joint between a door and a frame, comprising a holder having a base adapted to be secured to the frame and a wall projecting from one edge of the base, and an elastic strip having a base mounted on the base of the holder and adapted to engage the edge of the door and a wall projecting from one edge of the elastic strip base and engaging the wall of the base and adapted to be engaged by the side of the door, the faces of the base and wall of said strip which are engaged by the edge and side of the door being of convex form.

6. A closure for a joint between a door and a frame, comprising a holder having a base adapted to be secured to the frame and a wall projecting from one edge of the base, and an elastic strip having a base mounted on the base of the holder and adapted to engage the edge of the door and a wall projecting from one edge of the elastic strip base and engaging the wall of the base and adapted to be engaged by the side of the door, said holder being provided with an undercut groove on the inner corner between its base and wall, a reversely turned flange at the outer edge of the base and a concave seat on the inner side of its wall, and said strip having a longitudinal bead at its outer corner engaging the groove of said holder, a rabbet at the outer end of its base which is engaged by the flange of the holder base, and a convex face on the outer side of its wall which engages with the concave face of the holder wall.

7. A closure for a joint between a door and a frame, comprising a holder of rigid material adapted to be secured to the frame, a strip of elastic material mounted on said holder and having a base adapted to be engaged by the edge of said door and a wall adapted to be engaged by the side of said door, and means for adjusting the base cross wise on the frame.

8. A closure for a joint between a door and a frame, comprising a holder having a base adapted to be secured to the frame and a wall projecting from one edge of the base, and an elastic strip having a base mounted on the base of the holder and adapted to engage the edge of the door and a wall projecting from one edge of the elastic strip base and engaging the wall of the holder base and adapted to be engaged by the side of the door, the base of said elastic strip being provided on its rear side with a cavity and the wall of said strip having the form of a longitudinal tube, and the base of said holder being provided with transverse slots adapted to receive screws whereby the holder is fastened to the frame.

9. A closure for a joint between a door or the like and a support having a transverse face opposite the edge of the door and a longitudinal face opposite the side of the door, comprising an elastic strap of substantially L-shape in cross section, one leg of which forms a base arranged between the transverse face of said support and the edge of the door and the other leg forming a wall or flange arranged between the longitudinal face of said support and the side of said door.

In testimony whereof I affix my signature.

VICTOR A. LANG.